United States Patent [19]

Wilson et al.

[11] Patent Number: 4,978,132
[45] Date of Patent: Dec. 18, 1990

[54] PIVOTABLE HAND TRUCK APPARATUS

[76] Inventors: P. Henry Wilson, 4721 E. 146th St., Carmel; William A. Kelso, 7575 E. Maloney Rd., Brownsburg, Ind. 46112

[21] Appl. No.: 407,111

[22] Filed: Sep. 14, 1989

[51] Int. Cl.⁵ .............................................. B25H 1/08
[52] U.S. Cl. .............................. 280/47.131; 269/17; 269/905; 280/79.7; 414/589
[58] Field of Search .............. 280/47.131, 47.2, 47.24, 280/47.12, 47.28, 43.1, 79.7; 414/444, 491, 589, 684.3, 446, 447, 450, 457; 269/905, 17

[56] References Cited

U.S. PATENT DOCUMENTS

| | | | |
|---|---|---|---|
| 2,503,388 | 4/1950 | Hedlund | 214/1 |
| 2,955,632 | 10/1960 | Stone | 144/288 |
| 3,458,057 | 7/1969 | Stefan et al. | 269/905 |
| 3,643,935 | 2/1972 | Bell | 269/16 |
| 3,861,662 | 1/1975 | Morse | 269/17 |
| 3,871,054 | 3/1975 | Schaefer | 29/267 |
| 3,923,167 | 12/1975 | Blankenbeckler | 214/1 D |
| 4,050,671 | 9/1977 | Coleman | 254/7 R |
| 4,141,192 | 2/1979 | Augustine | 52/749 |
| 4,278,244 | 7/1981 | Carter | 269/17 |
| 4,746,141 | 5/1988 | Willis | 280/655 |
| 4,752,173 | 6/1988 | Fleming | 414/10 |

FOREIGN PATENT DOCUMENTS

| | | | |
|---|---|---|---|
| 489912 | 1/1953 | Canada | 280/47.2 |
| 2546907 | 6/1977 | Fed. Rep. of Germany | 414/589 |

*Primary Examiner*—David M. Mitchell
*Attorney, Agent, or Firm*—Willian, Brinks Olds, Hofer Gilson & Lione

[57] ABSTRACT

A pivotable hand truck for supporting or installing a heavy object is provided comprising an L-shaped structure, a pair of wheels secured to the L-shaped structure about which the structure may be pivoted between horizontal and vertical positions, and lifting means carried by the structure adapted to vertically adjust the object to a selected height above the floor surface. The lifting means is defined by a floor-engaging pedal affixed to the L-shaped structure, height-adjusting members carried by the structure, and activating means for activating the height-adjusting members when the pedal is moved between a non-operational position and an operational position. The activating means is defined by a rod member secured to the apparatus which engages the height-adjusting members, and coupling means mechanically coupling the rod member to the pedal. The coupling means is defined by a plurality of interconnecting lever arms, or, alternatively, a cable-and-pulley mechanism.

In use, the operator depresses the floor-engaging fulcrum elevating one end of the structure. The depressing of the pedal activates the activating means which, in turn, activates the height-adjusting members which, in turn, engage the floor surface and elevate the opposite end of the structure, thereby variably elevating the object as desired.

14 Claims, 5 Drawing Sheets

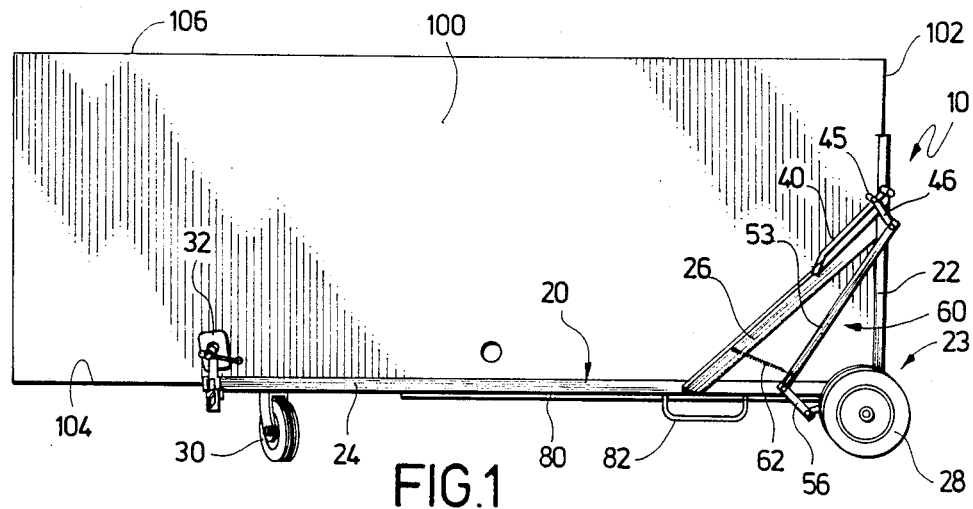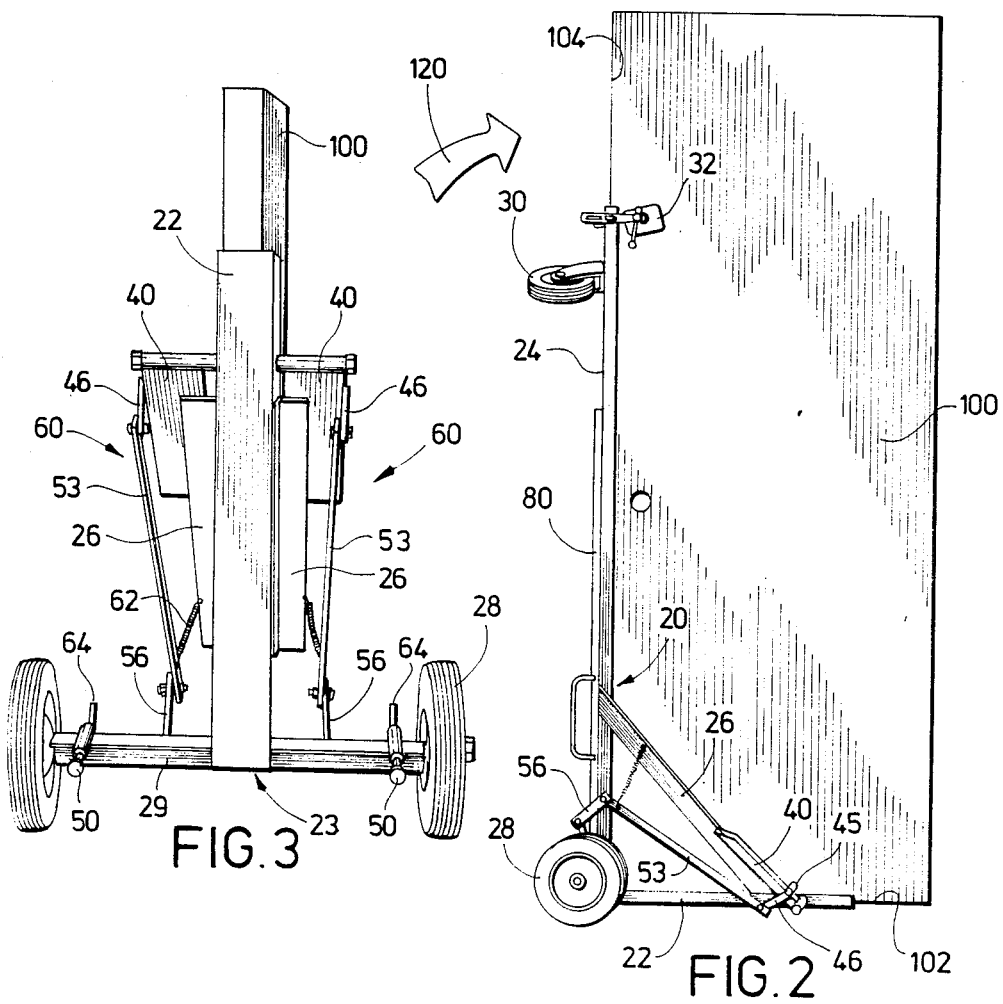

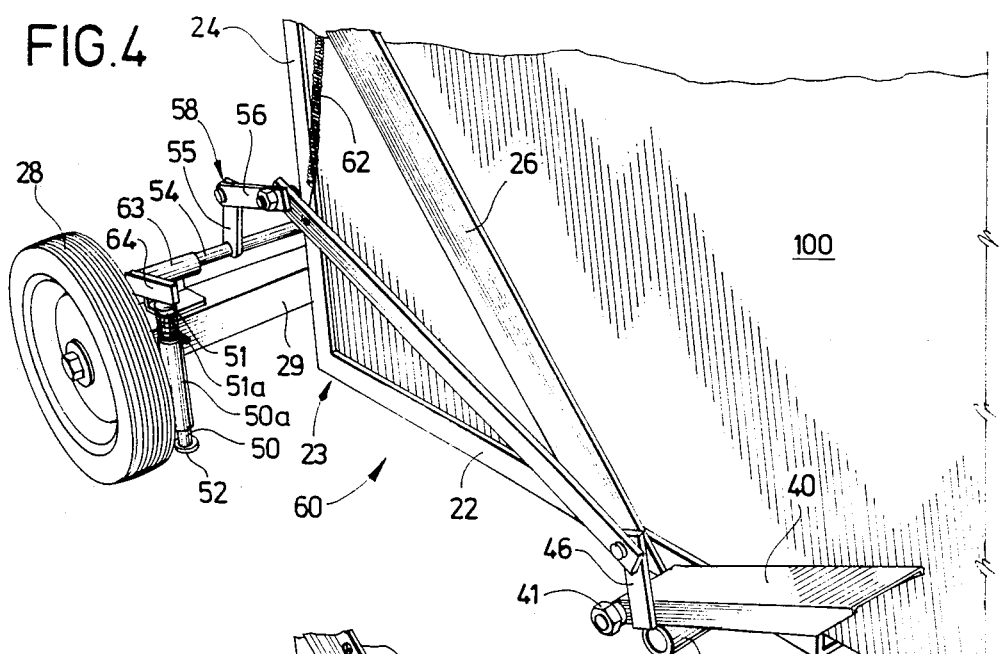
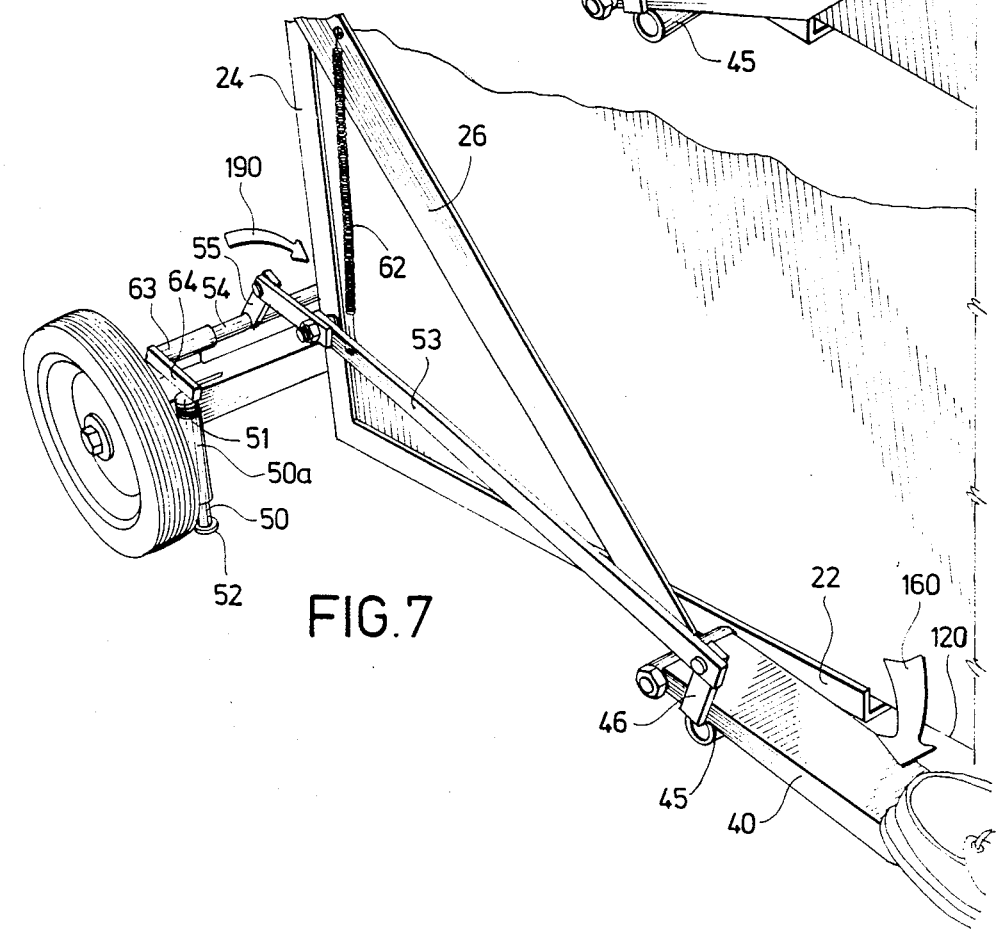

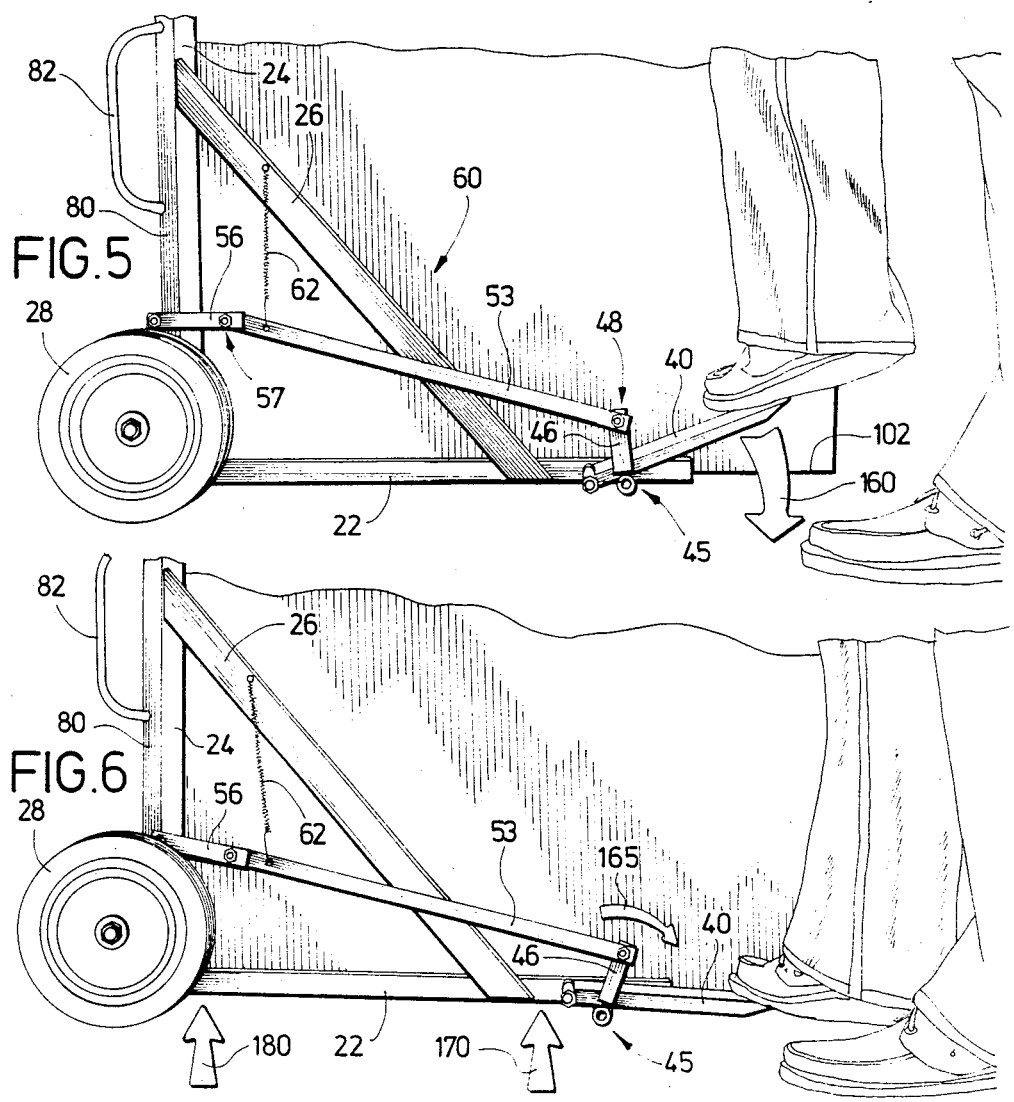

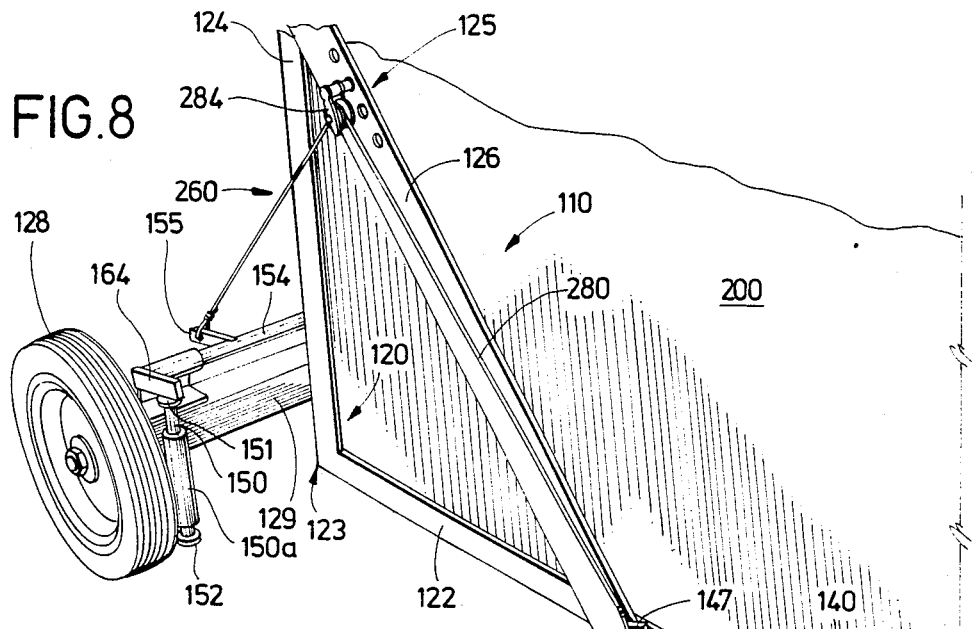
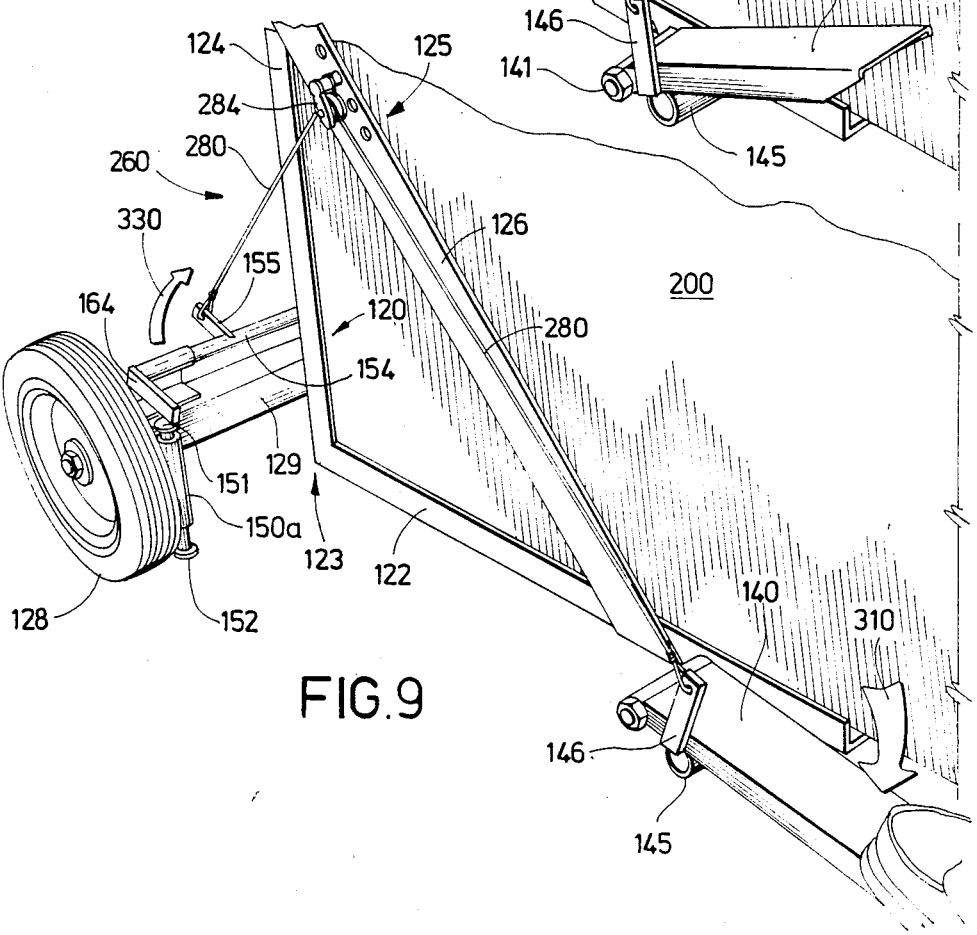

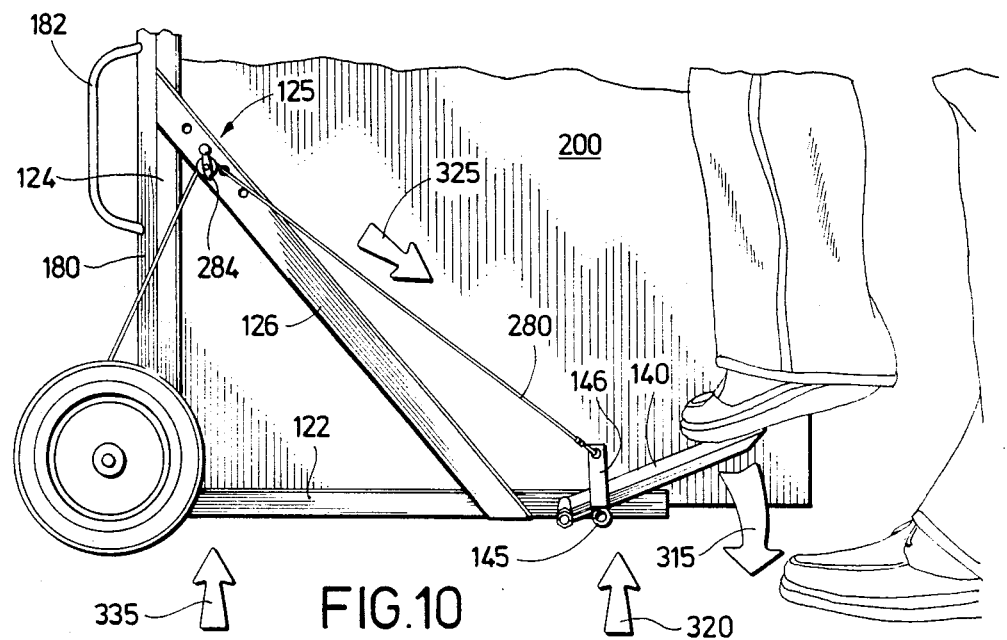

PIVOTABLE HAND TRUCK APPARATUS

TECHNICAL FIELD

This invention relates to pivotable hand truck apparatuses, and more particularly, relates to a pivotable hand truck apparatus used to secure, transport, and elevate heavy objects.

BACKGROUND ART

In light of the increasing costs of labor, attempts are continuously being made to develop apparatuses, tools, and other articles for the construction trade to increase the efficiency of the construction work being performed and to maintain control of the increasing cost of labor. One particular area in which such attempts have been directed is the preparation and installation of large, heavy rectangular objects, such as windows, panels and doors. These attempts are more particularly being directed in the area of construction of public or commercial buildings as there is an increasing practice to use heavier and larger windows, panels, and doors in construction of this type.

In the preparation and installation of such objects, it is often necessary that the object be arranged in a horizontal position so that object may be prepared for installation. In "hanging" a door, for example, the long edge of the door must be mortised for the hinges prior to installation. The selected door must be thereafter pivoted, however, to a vertical position to size and align the door in the selected door frame.

In conventional construction practices of installing or hanging a door, a workman must first remove the selected door from a stack of doors (which is the standard method of storage for doors at a construction site). The selected door is then carried by the workman to a location where the varied operations of sizing the door, butt routing and mortising the door for hinges, locks and handles are accomplished, all of which require manual manipulation of the door. Once these tasks are completed, the door must then be manually lifted and fitted into the selected door frame. As the weight and size of construction articles of this type have been steadily increasing, this task has naturally become increasingly more difficult for a single workman to perform. For example, it has become nearly impossible for a single workman of average strength to prepare and install a fire door or hospital door, many of which may weigh upwards of two hundred pounds or more. These problems are similarly encountered in the preparation and installation of large, heavy windows or panels. This trend in commercial construction practices has required the use of two workmen to prepare and install such heavy articles, or resulted in a lessening of the number of such objects installed during a work period by a single workman.

There has developed a definite need for an apparatus which permits a single workman to secure, transport and install a heavy object such as a door, window or panel, in a quick and efficient manner.

Prior attempts at providing an apparatus to be used in the practice of securing, transporting, lifting and installing heavy construction articles such as doors, panels, windows, ad the like are disclosed in U.S. Pat. Nos. 2,503,388; 2,955,632; 3,643,935; 3,861,662; 3,871,054; 3,923,167; 4,050,671; 4,141,192; 4,278,244; 4,746,141; and 4,752,173.

DISCLOSURE OF THE INVENTION

This invention provides a pivotable hand truck or dolly apparatus for holding and transporting heavy objects, generally having a rectangular shape, during their preparation and installation. The hand truck apparatus provided by this invention generally comprises an L-shaped structure for supporting the object, means attached to the structure about which the structure may be pivoted substantially 90 degrees, and lifting means adapted to vertically adjust the object during installation or other desired tasks.

The structure includes two support members arranged transversely to each other wherein one of the support members is preferably longer than the other, thereby defining an L-shaped structure. Each member is adapted to support an edge of the object. The pivoting means employed by this invention includes axle means connected to the structure and a pair of wheels attached to the axle means which allows the apparatus to be rolled into position and to be pivoted between a substantially horizontal position and a substantially vertical position.

The lifting means provided by this invention includes at least one pedal affixed to one of the support members, a fulcrum arranged on the underside of the pedal, a height-adjusting member carried by the structure, and means for activating the heightadjusting member when the pedal is moved from a non-operational position to an operational position. In one preferred embodiment, the activating means includes a rod member secured to the apparatus disposed in a plane transverse to the plane of the structure, and a plurality of interconnecting lever arms mechanically coupling the pedal to the rod member. In a second preferred embodiment, the means coupling the pedal to the rod member is defined by a cable-and-pulley means.

In use, the object is placed upon the L-shaped structure of the apparatus upon its edge in a substantially horizontal position to allow a workman to work on the object as needed. The apparatus carrying the object is then rolled to a desired location and pivoted about the pivoting means so that the object is now in a substantially vertical position. The lifting means is then activated to vertically adjust the object to a desired height to allow the workman to install the object or perform other desired functions.

When the pedal of the lifting means is depressed, the pedal activates the mechanical coupling means which, in turn, rotates the rod member, which, in turn, engages the height-adjusting member, thereby urging the height-adjusting member downwardly so that the member engages the floor surface and, along with the fulcrum arranged on the underside of the pedal, vertically elevates the structure and the object supported thereon to a desired height above the floor surface.

BRIEF DESCRIPTION OF THE DRAWINGS

FIG. 1 is a side plan view of a hand truck apparatus incorporating a presently preferred embodiment of the invention shown supporting a door in a substantially horizontal position;

FIG. 2 is a side plan view of the hand truck apparatus of FIG. 1 shown supporting a door in a substantially vertical position;

FIG. 3 is a perspective view taken from the right side of the hand truck apparatus of FIG. 1;

FIG. 4 is an enlarged partial perspective view of the hand truck apparatus of FIG. 1 illustrating lever arm-lifting means incorporated therein;

FIG. 5 is a side view of the lever arm-lifting means of FIG. 4 being activated by a workman;

FIG. 6 is a side view of the lever arm-lifting means of FIG. 4 showing the lever arm-lifting means in a fully activated position;

FIG. 7 is an enlarged partial perspective view of the lever arm-lifting means of FIG. 6 illustrating the lifting means in a fully activated position;

FIG. 8 is an enlarged partial perspective view of an alternative embodiment of the hand truck apparatus provided by this invention illustrating cable-and-pulley lifting means incorporated therein;

FIG. 9 is an enlarged partial perspective view of the cable-and-pulley lifting means of FIG. 8 illustrating the cable-and-pulley lifting means in a fully activated position; and FIG. 10 is a side view of the cable-and-pulley lifting means of FIG. 8 being activated by a workman.

BEST MODE FOR CARRYING OUT THE INVENTION

As shown in FIGS. 1 and 2, a hand truck or dolly apparatus 10 incorporating a first presently preferred embodiment of the invention is shown comprising a structure 20 including a first support member 22 and a second support member 24, pivoting means 28 attached to structure 20, and lifting means 60 carried by the structure.

Apparatus 10 is specially adapted to secure, transport, and elevate a heavy object 100, such as a door intended for commercial use, during its preparation and installation. First support member 22 is preferably a short support member whereas second support member 24 is preferably an elongated support member, thereby defining the substantially L-shaped structure 20. Short support member 22 is adapted to support a first edge 102 of object 100, and elongated support member 24 is adapted to support a second edge 104 of object 100. First edge 102 and short support member 22 are positioned substantially transversely to second edge 104 and elongated support member 24, respectively. Elongated support member 24 is connected to short support member 22 at a point defining an apex 23 (more clearly shown in FIG. 4) of structure 20. Pivoting means 28, preferably a pair of wheels, is arranged substantially transversely to the plane in which structure 20 is arranged.

Support means, such as provided by a pivotable wheel 30, is preferably secured to elongated support member 24 at a point adjacent the end of the elongated support member opposite apex 23. Support means 30 engages the floor surface and supports the elongated support member and edge 104 of object 100 at a set distance above the floor surface. A clamp 32, secured to elongated support member 24, is adapted to releasably engage object 100 and support the object upon structure 20.

Apparatus 10 further includes a diagonal support member 26 connected to elongated support member 24 at one end and to short support member 22 at the other end. Diagonal support member 26, along with clamp 32, secures door 100 within structure 20 and prevents the object from moving excessively within the structure or otherwise falling out or off of the structure while in use. Diagonal support member 26 further provides a strengthening structural member interconnecting support members 22 and 24.

Lifting means 60 is more clearly shown in FIGS. 3-5. It is noted for clarification purposes that FIG. 3 is a side view of apparatus 10 while in a substantially horizontal position, as shown in FIG. 1, whereas the partial view of the apparatus shown in FIG. 4 is in a substantially vertical position, as shown in FIG. 2. FIGS. 4 and 5 show one preferred embodiment of this invention which includes lifting means 60 comprising at least one pedal 50 hingedly affixed to short support member 22 by conventional means (such as nut-and-bolt means 41) at a point adjacent the end of the short support member opposite apex 23, a rod member 54 rotatably secured to apparatus 10 adjacent apex 23, height-adjusting members defined by lifting legs 50, a long lever arm 53, and a short lever arm 56. Pedal 40 is provided with a floor-engaging fulcrum 45 arranged on the underside thereof.

Referring now to FIGS. 4 and 5, lifting means 60 more particularly includes pedal 40 having a first link 46 securely affixed thereto, a long lever arm 53 coupled to a short lever arm 56, a second link 55 connected to rod member 54, a third link 64 also connected to rod member 54, and a height-adjusting member provided by lifting leg 50. First link 46 is securely affixed to pedal 40 and arranged substantially transversely to the plane of the pedal so that the link moves in cooperation with the pedal. Link 46 is coupled to long lever arm 53 at junction 48 where long lever arm 53 and first link 46 move in relation to each other. Long lever arm 53 is, in turn, coupled to short lever arm 56 at junction 57 where long lever arm 53 and short lever arm 56 move in relation to each other. Short lever arm 56 is, in turn, coupled to second link 55 at junction 58, where short lever arm 56 and second link 55 move in relation to each other. Second link 55 and third link 64 are both securely affixed to rod member 54 so that each moves in cooperation with the rod member. First spring 62 is provided and is connected to the lever arm-lifting means at one end to the diagonal or elongated support members at the other end. The spring is stretched when pedal 40 is fully depressed, and contracts and moves lifting means 60 into a non-operational position when the pedal is subsequently released.

Rod member 54 is rotatably secured to axle means 29 by brackets 63 which allow rod member 54 to rotate therewithin. Third link 64 is arranged in alignment with head portion 51 provided on lifting leg 50. Lifting leg 50 is further provided with base portion 52 and is slidably carried within sleeve 50a which is secured to axle means 29. Second spring 51a is preferably arranged between the upper collar of sleeve 50a and the underside of head portion 51 to urge lifting leg 50 upwardly when pedal 40 is released.

In use, a substantially square or rectangular object 100, such as a door, is positioned on structure 20 in a substantially horizontal position (FIG. 1), and clamp 32 is fastened about the object to, along with diagonal support member 26, support the object upon the structure. A workman is then able to work upon upper edge 106 of the object to prepare the object for various uses. For example, upper edge 106 of the object, such as a door, may be mortised to prepare the object to receive hinges. Wheels 28 and pivotable wheel 30 then permit the apparatus and the object supported thereon to be rolled to a desired location. It is normally expected that the object will be rolled to a position near the location at which the object is to be used or installed. When positioned at the desired location, apparatus 10 and object 100 are then rotated 90° substantially vertically about roller means 28, indicated by reference arrow 120 shown in FIG. 2, so that short support member 22 and first edge 102 of object 100 are in a substantially horizontal position and elongated support member 24 and second edge 104 are in a substantially vertical position.

The activation of lifting means 60 is shown in FIG. 5-7 wherein a workman depresses pedal 40, as shown by reference arrow 160 (FIG. 5) which, in turn, cooperatively rotates first link 46 forwardly in a direction generally toward the workman, as shown by reference arrow 165 (FIG. 6). At a point during depression of pedal 40, floor-engaging fulcrum 45, affixed to the underneath side of the pedal, engages the floor surface; and the continued depression of pedal 40 acts to lift a portion of short support member 22 and of edge 102 vertically above the floor surface, as shown by reference arrow 170 (FIG. 6). The downward movement of pedal 40 cooperatively rotates first link 46 forwardly which, in turn, pulls long lever arm 53 in a cooperative direction generally toward pedal 40 and the workman. Long lever arm 53 in turn pulls short lever arm 56 in a cooperative direction generally toward pedal 40 and the workman and short lever arm 56 in turn pulls second link 55 in a direction generally toward pedal 40 and the workman, as shown by reference arrow 190 (FIG. 7). The induced movement of second link 55 causes rod member 54 and third link 64 to rotate in a cooperative direction generally toward pedal 40 shown by reference arrow 190. As third link 64 rotates forwardly, it engages head portion 51 of lifting leg 50, thereby urging lifting leg 50 downwardly until base portion 52 engages the floor surface. As base portion 52 engages the floor surface and the downward movement of the lifting leg is continued, the apex portion of structure 20 is elevated, as shown by reference arrow 180 (FIG. 6). Thus, lifting legs 50 and floor-engaging fulcrum 45 coact to elevate structure 20 upwardly above the floor surface, as shown by reference arrows 170 and 180 (FIG. 6). While object 100 is in an elevated position, the workman may perform the desired tasks. For example, the workman may secure hinges, which have previously been secured to the selected door frame, to the door to hang the door.

After the desired task is completed, pedal 40 is released which lowers short support member 22 so that the support member is no longer in contact with and supporting edge 102 of object 100. As pedal 40 is released, spring 62 acts to return lever arm-lifting means 60 to a non-operational position as shown in FIG. 2; and second spring 63 urges lifting legs 50 upwardly so as to disengage the lifting legs from the floor surface. Apparatus 10 may then simply be removed from below the object by rolling it out from beneath the object.

It is to be appreciated that rod member 54 need not be defined by a single rod member extending substantially the length of axle means 29. It is contemplated that lifting means 60, preferably arranged on each side of the structure, may each employ a separate means to deliver the movement force initiated by pedal 40 to lifting leg 50. In fact, rod member 54 is not essential to the effective use of this invention as it is further contemplated that means coupled to pedal 40 may be employed to directly activate lifting leg 50, thereby eliminating the need for rod member 54. Thus, the invention is not to be limited by the specific embodiment set forth herein.

Apparatus 10 further includes handle 82 (FIG. 1) arranged on elongated support member 24 to facilitate transporting of the apparatus while not in use and supporting member 80 (FIG. 1) affixed externally of elongated support member 24 to provide added strength to the apparatus. It is contemplated that elongated support member 24 may be made foldable or telescopically extendable to facilitate transport and storage of the apparatus.

The height above the floor surface at which the door may be hung or, for example, the positions at which hinges are arranged along the edge of a door, may vary. The apparatus provided by this embodiment of the invention accommodates such variations by allowing the workman, to the extent to which he depresses the pedal, to vertically adjust the height of the short support member and the edge of the object as desired.

An alternative embodiment presented by this invention is shown in FIGS. 8-10. The apparatus illustrated therein is substantially identical to the prior embodiment of this invention shown in FIGS. 1-7, except for the alternative lifting means employed in this second embodiment. Thus, for purposes of brevity, the structural interrelationships of the components provided in the alternative embodiment, except for the alternative lifting means, will not be discussed in detail. As shown in FIG. 8, the hand truck or dolly apparatus 110 incorporating a second alternative embodiment of the present invention is shown comprising a structure 120 including a first support member 122 and a second support member 124, pivoting means 128 attached to the structure and lifting means 260 carried by the structure. Apparatus 110 is likewise specially adapted to secure, transport and elevate heavy objects, such as a door intended for commercial use, during its preparation and installation. Lifting means 260 includes at least one pedal 140 hingedly affixed to short support member 122 by conventional means (such as nut-and-bolt means 141) at a point adjacent the end of the short support member opposite apex 123, a rod member 154 rotatably secured to apparatus 110 adjacent apex 123 of structure 120, height-adjusting members defined by lifting legs 150 and cable-and-pulley means including belt or cable 180 and pulley wheel 184. Diagonal support member 126 is provided with a plurality of holes 125 formed therein adjacent the point of connection between the diagonal support member and elongated support member 124 and pulley wheel 184 is connected to the diagonal support member 126 at one of the selected holes. The plurality of holes 125 permits one to connect pulley wheel 184 at a different hole to maintain the tension of cable 180 or to adjust the extent of vertical rise obtainable by the apparatus. Pedal 140 is provided with a floor-engaging fulcrum 145 arranged on the underside thereof.

As shown in FIG. 8, pedal 140 has a first link member 146 securely affixed thereto and arranged substantially traversely to the plane of the pedal. Cable 180 is connected at one end to first link 146, preferably at upper end 147, and extends through pulley wheel 184 and is connected at the other end to a second link 155 connected to the rod member 154. It must be noted that the orientation of second link member 155 in relation to third link member 164 is different from that provided in the first embodiment. Referring back to FIG. 4, the relative orientation between second link member 55 and third link member 64 is preferably about 90°. In the alternative embodiment shown in FIG. 8, link member 155 extends outwardly from rod member 154 at an angle approximately 180° from the position of third link member 164, the preferred angle being from about 135° to 180°.

The first link member 146 is securely affixed to pedal 140 so that first link member 46 moves in cooperation with the pedal. Second link member 155 and third link member 164 are likewise securely affixed to rod member 154 so that each link member moves in cooperation with the rod member. Third link 164 is arranged in alignment with head portion 151 provided on lifting leg 150 which is provided with base portion 152 and slidably carried within sleeve 150a. Although not shown in FIG. 8, a compression spring may be arranged between the upper collar of sleeve 150a and the underside of head portion 151 to urge the lifting leg 50 upwardly when pedal 140 is released.

The activation of lifting means 260 is shown in FIGS. 9 and 10 wherein a workman depresses pedal 140, as shown by reference arrows 310 and 315 which, in turn, cooperatively rotates first link 146 forwardly in a direction generally toward the workman. At a point during the depression of pedal 140, floor-engaging fulcrum 145 engages the floor surface; and the continued depression of the pedal acts to lift a portion of short support member 122 vertically above the floor surface, as shown by reference arrow 320. As noted, the downward movement of pedal 140 cooperatively rotates first link 146 forwardly which, in turn, pulls cable 280 in a cooperative direction generally downwardly toward pedal 140 as shown by reference arrow 325 (FIG. 10). Cable 280 in turn rotates second link 155 generally upwardly as indicated by reference arrow 330 (FIG. 9) which cooperatively rotates rod member 154 in the same general direction as indicated by reference arrow 330. The rotational movement of rod member 154 cooperatively rotates third link 164 in the same general forward direction whereat third link 164 engages head portion 151 of lifting leg 150, thereby urging lifting leg 150 downwardly until base portion 152 engages the floor surface. As base portion 152 engages the floor surface and its downward movement continued, the apex portion 123 of the structure is elevated vertically as shown by reference arrow 335 (FIG. 10). Thus, lifting legs 150 and floor-engaging fulcrum 145 coact to elevate structure 120 vertically above the floor surface, as shown by reference arrows 320 and 335 of FIG. 10. While object 200 is an elevated position, the workman may perform any one of a variety of desired tasks.

After the desired task is completed, pedal 140 is then released which lowers short support member 122 so that it is no longer in contact or supporting the edge of object 200. Apparatus 110 may then simply be removed from below object 200 by rolling it out from beneath the object.

As in the first embodiment provided by this invention, it is to be appreciated that rod member 154 need not be defined by a single rod member extending substantially the length of axle means 129. It is contemplated that lifting means 260 may employ separate means to deliver the movement force initiated by pedal 140 to lifting leg 150. Furthermore, rod member 154 is not essential to the effective use of this embodiment provided by the invention as it is further contemplated that a variety of means coupling the lifting legs to the pedal may be employed to directly activate lifting leg 150, thereby eliminating the need for rod member 154. Thus, as noted above, the invention is not to be limited by the specific embodiment set forth herein.

Elongated support members 24 and 124 and short support members 22 and 122 preferably define U-shaped channels in their cross-sections and include padding material (not shown) disposed within the U-shaped channels to protect the edges of the object while it is being supported and carried therein. Apparatus 110 further includes handle 182 (FIG. 10) arranged on elongated support member 124 to facilitate transporting of the apparatus while not in use and supporting member 180 (FIG. 10) affixed externally of elongated support member 124 to provide added strength to the apparatus. It is also contemplated that elongated support member 124 may be made foldable or telescopically extendable. to facilitate transport and storage of the apparatus.

The height above the floor surface at which the object need be raised by the apparatus 110 may vary. The workman is allowed to vary this height by varying the extent to which he depresses pedal 140 or by the positioning of pulley wheel 284 in one of the holes 125 arranged in diagonal support member 126.

As shown in the figures presented herewith, the apparatus provided by this invention preferably includes lifting means arranged on each side of the structure to facilitate the elevating of such heavy objects in a variety of positions, depending upon from which side of the object the workman must operate. This invention may still be effectively used, however, by employing only a single lifting means arranged on only one side of the structure.

Thus, the invention provides a hand truck apparatus disclosed above in connection with the embodiments shown FIGS. 1-10. It must be understood, however, that there are other embodiments and variations of the invention which may be developed in that the invention is not limited to the preferred embodiments and best mode of operation currently understood and described herein, but is only limited by the scope of the following claims.

We claim:

1. A pivotable hand truck apparatus for holding and transporting a generally rectangular-shaped object comprising:

a structure for supporting the object by two edges comprising a first support member adapted to support a first edge of said object and a second support member adapted to support a second edge of said object, said second edge being positioned substantially transversely to said first edge, and said first support member being positioned substantially transversely to said second support member and being connected thereto at a point defining an apex;

means secured to said structure adjacent the apex about which the structure may be pivoted between substantially horizontal and vertical positions; and p1 lifting means carried by said structure adapted to vertically adjust the object, said support structure being adapted to first receive said object while disposed with the second support member and the second edge of the object supported thereby being in substantially horizontal position, said support structure thereafter being adapted to be pivoted about said pivoting means so that said first support member and said first edge of said object supported thereby are disposed in a substantially horizontal position and said second support member and said second edge of said object supported thereby are disposed in a substantially vertical position;

said lifting means being adapted to be thereafter activated to vertically adjust the object to a selected height above a floor surface, said lifting means comprising:

at least one pedal hingedly affixed to said first support member, said at least one pedal having a floor-engaging fulcrum arranged on the underside thereof, said pedal being adapted to be moved between a non-operational position and an operation position;

at least one height-adjusting member carried by said structure; and means for activating said height adjusting member when said pedal is moved from the non-operational position to the operational position.

2. The pivotable hand truck apparatus as in claim 1 wherein said first support member is a short support member and said second support member is an elongated support member, said short support member and said elongated support member defining a substantially L-shaped structure.

3. The pivotable hand truck apparatus as in claim 1 wherein the first support member and the second support member define U-shaped channels in cross section.

4. The pivotable hand truck apparatus of claim 1 wherein said pivoting means comprises:

axle means connected to the second support member adjacent the apex of the structure; and a pair of wheels attached to the axle means for rolling the hand truck apparatus and for pivoting the support members between substantially horizontal and vertical positions.

5. The pivotable hand truck apparatus as in claim 1 further comprising support means secured to the second support member adjacent the end of the elongated second member opposite the apex, said support means engaging the floor surface and supporting the second support member thereabove.

6. The pivotable hand truck apparatus as in claim 5 wherein said support means comprises a pivotable wheel.

7. The pivotable hand truck apparatus as in claim 1 further comprising:

a diagonal support member connected to the first support member at one end ad to the second support member at the other end; and a clamping device affixed to the second support member adjacent the end thereof opposite the apex, said clamping device detachably securing said object to said apparatus, said object being further supported upon the structure by said diagonal support member.

8. The pivotable hand truck apparatus as in claim 1 wherein said activating means comprises:

a rod member rotatably secured to said apparatus adjacent the apex, said rod member being disposed in a plane transverse to the plane of said structure; and a plurality of interconnecting lever arms mechanically coupling said pedal to said rod member, said pedal being adapted to be depressed whereby the floor-engaging fulcrum is urged against the floor surface, thereby elevating the end of said first support member opposite the apex, the action of depressing said pedal substantially simultaneously activating said plurality of interconnecting lever arms which, in turn, rotates said rod member, said rod member being adapted to urge said height-adjusting member downwardly so that said height-adjusting member engages the floor surface and elevates the apex of said structure above the floor surface.

9. The pivotable hand truck apparatus as in claim 8 further comprising a spring connected to one of said plurality of lever arms at one end and to said structure at the other end, said spring extending when aid pedal is depressed and retracting when said pedal is released to move said plurality of lever arms and said pedal to a non-operational position.

10. The pivotable hand truck apparatus as in claim 1 wherein said lifting means is adapted to vertically adjust said object varying distances above the floor surface dependent upon the extent to which said pedal is depressed, said object being vertically adjusted a maximum distance above the floor surface when said pedal is fully depressed.

11. The pivotable and truck apparatus of claim 8 further comprising:

a second pedal hingedly affixed to said first support member, said second pedal having a floor-engaging fulcrum arranged on the underside thereof;

a second height-adjusting member carried by said structure; and a second plurality of interconnecting lever arms mechanically coupling said second pedal to said rod member, said second pedal being adapted to be depressed whereby the floor-engaging fulcrum is urged against the floor surface, thereby elevating the end of said first support member opposite the apex, the action of depressing said second pedal substantially simultaneously activating said second plurality of interconnecting lever arms which, in turn, rotates said rod member, said rod member being adapted to engage said second height-adjusting member, thereby urging said second height-adjusting member downwardly so that said second height-adjusting member engages the floor surface and elevates the apex of said structure above the floor surface, said second pedal, second height-adjusting member, and second plurality of interconnecting lever arms being arranged on the side of aid structure opposite the side at which said first pedal, first height-adjusting member, and first plurality of interconnecting lever arms are arranged.

12. The pivotable hand truck apparatus as in claim 1 wherein said activating means comprises:

a rod member rotatably secured to said apparatus adjacent the apex, said rod member being disposed in a plane transverse to the plane of said structure; and cable-and-pulley means, said cable-and-pulley means comprising:

a flexible cable connected at one end to the pedal and at the other end to the rod member; and a pulley wheel arranged on the structure adapted to carry said flexible cable;

said pedal being adapted to be depressed urging the floor-engaging fulcrum against the floor surface and elevating the end of said first support member opposite the apex, the depressing of said pedal substantially simultaneously activating said cable-and-pulley means which, in turn, rotates said rod member, said rod member being adapted to engage said height-adjusting member urging said height-adjusting member downwardly so that said heightadjusting member engages the floor surface and elevates the apex of said structure above the floor surface.

13. The pivotable hand truck apparatus of claim 12 further comprising:
a second pedal hingedly affixed to said first support member,
said second pedal having a floor-engaging fulcrum arranged on the underside thereof;
a second height-adjusting member carried by said structure; and
a second cable and pulley means mechanically coupling said second pedal to said rod member,
said second pedal being adapted to be depressed urging the floor-engaging fulcrum against the floor surface and elevating the end of said first support member opposite the apex, the action of depressing said second pedal substantially simultaneously activating said second cable and pulley means which, in turn, rotates said rod member, said rod member being adapted to engage said second height-adjusting member urging said second height-adjusting member downwardly so that said second height member engages the floor surface and elevates the apex of said structure above the floor surface,
said second pedal, second height-adjusting member, and second cable and pulley means arms being arranged on the side of said structure opposite the side at which said first pedal, first height-adjusting member, and first cable and pulley means are arranged.

14. A pivotable dolly for handling a door comprising:
an L-shaped structure for supporting the door by two edges,
said L-shaped structure for supporting the door by two edges,
said L-shaped structure comprising a short support member adapted to support a first short edge of the door and an elongated support member adapted to support a second long edge of the door, said second edge being positioned substantially transversely to said first edge, and said short support member being positioned substantially transversely to aid elongated support member and being connected thereto at a point defining an apex;
means secured to said L-shaped structure about which the dolly may be pivoted between substantially horizontal and vertical positions, said pivoting means comprising axle means connected to said elongated support member adjacent the apex and a pair of wheels attached to the axle means for rolling the dolly and for pivoting the L-shaped structure between substantially horizontal and vertical positions; and
lifting means carried by the L-shaped structure adapted to vertically adjust the door, said lifting means comprising:
a pair of pedals hingedly affixed to said short support member, one pedal arranged on each side thereof, each of said pedals having a floor-engaging fulcrum arranged on the underside thereof, the pedal being adapted to be moved between a non-operational position and an operational position;
a pair of lifting legs carried by the L-shaped structure;
a rod member rotatably secured to the L-shaped structure, said rod member being disposed in a plane transverse to the plane of the L-shaped structure; and
cable-and-pulley assembly mechanically coupling said pair of pedals to said rod member,
each of said pedals being adapted to be depressed independently or simultaneously of the other pedal whereby the floor-engaging fulcrum arranged on the underside thereof is urged against the floor surface elevating the ends of the short support member opposite the apex, the action of depressing one of the pedals substantially simultaneously activating the cable-and-pulley assembly which, in turn, rotates the rod member, the rod member being adapted to engage the lifting legs urging the lifting legs downwardly so that the lifting legs engage the floor surface and vertically elevate the apex of the L-shaped structure above the floor surface.

* * * * *